United States Patent
Raj et al.

(10) Patent No.: US 11,811,909 B2
(45) Date of Patent: Nov. 7, 2023

(54) INFORMATION PROCESSING APPARATUS, METHOD AND SECURE PROTOCOL FOR SECURE STORAGE AND TRANSFER OF DATA

(71) Applicants: Preet Raj, New York, NY (US); Shashank Singh, Livingston, NJ (US)

(72) Inventors: Preet Raj, New York, NY (US); Shashank Singh, Livingston, NJ (US)

(*) Notice: Subject to any disclaimer, the term of this patent is extended or adjusted under 35 U.S.C. 154(b) by 201 days.

(21) Appl. No.: 17/498,243

(22) Filed: Oct. 11, 2021

(65) Prior Publication Data

US 2022/0123917 A1 Apr. 21, 2022

Related U.S. Application Data

(60) Provisional application No. 63/093,443, filed on Oct. 19, 2020.

(51) Int. Cl.
| | |
|---|---|
| *H04L 9/06* | (2006.01) |
| *H04L 9/30* | (2006.01) |
| *H04L 9/08* | (2006.01) |

(52) U.S. Cl.
CPC .......... *H04L 9/0631* (2013.01); *H04L 9/0825* (2013.01); *H04L 9/0861* (2013.01); *H04L 9/302* (2013.01)

(58) Field of Classification Search
CPC ... H04L 9/0631; H04L 9/0825; H04L 9/0861; H04L 9/302
See application file for complete search history.

(56) References Cited

U.S. PATENT DOCUMENTS 11,349,644 B1* 5/2022 Stapleton .............. H04L 9/0869
2014/0355757 A1* 12/2014 Shrivastava .......... H04L 9/0822
380/46

(Continued)

FOREIGN PATENT DOCUMENTS

| CN | 105515762 A | 4/2016 |
| CN | 106685969 A | 5/2017 |
| IN | 202121007215 | 1/2021 |

OTHER PUBLICATIONS

Abhishek Guru et al., "AES and RSA-Based Hybrid Algorithms for Message Encryption & Decryption"; Depailment of Computer Science and engineering, Kalinga University, Naya, Raipur, India; IT in Industry, vol. 9, No. 1, 2021 Published Online Jan. 3, 2021; 7 pages.

(Continued)

*Primary Examiner* — Darshan I Dhruv
(74) *Attorney, Agent, or Firm* — Gearhart Law, LLC; David Postolski

(57) ABSTRACT

The invention provides an information processing apparatus, method, and security protocol for secure storage and transfer of data using two-level encryption by combining RSA and AES keys. The apparatus includes circuitry (100) configured to receive encryption request, encrypt the data to generate first encryption data. The encryption of the data is based on an AES user key (103) and the received encryption request. The circuitry is further configured to encrypt the first encryption data to generate second encryption data, decrypt the second encryption data to generate first decryption data. The decryption of the second encryption data is based on a company AES key (107). The circuitry (100) is further configured to decrypt the first decryption data to generate the original data. The decryption of the first decryption data is (Continued)

based on an AES user key (103), and the second decryption data corresponds to the transmitted data.

6 Claims, 7 Drawing Sheets

(56) References Cited

U.S. PATENT DOCUMENTS

| | | | |
|---|---|---|---|
| 2018/0167204 A1* | 6/2018 | Wall | G06F 21/6209 |
| 2019/0116032 A1* | 4/2019 | Pogmore | H04L 9/0863 |
| 2019/0297063 A1* | 9/2019 | De Gaspari | H04L 9/0847 |
| 2020/0195621 A1* | 6/2020 | Li | H04L 9/0822 |
| 2020/0304475 A1* | 9/2020 | Zhang | H04L 63/0442 |
| 2021/0344485 A1* | 11/2021 | Levin | H04L 9/0825 |
| 2022/0086187 A1* | 3/2022 | LeBeau | H04L 63/062 |

OTHER PUBLICATIONS

E. S. I. Harba; "Secure Data Encryption Through a Combination of AES, RSA and HMAC"; Computer Unit and Internet, College of Arts, University of Baghdad, Baghdad, Iraq; Engineering, Technology & Applied Sciences Research; vol. 7, No. 4, 2017 1781-1785; 5 pages.

* cited by examiner

INFORMATION PROCESSING APPARATUS, METHOD AND SECURE PROTOCOL FOR SECURE STORAGE AND TRANSFER OF DATA

CROSS REFERENCE TO RELATED APPLICATIONS

This application claims the benefit of U.S. Provisional Patent Application, Ser. No. 63/093,443 entitled Enhanced Encryption Beyond AES and RSAs, filed on Oct. 19, 2020; the entirety of the above-noted application(s) is incorporated by reference herein.

The following complete specification particularly describes the invention and the manner in which it is performed:

FIELD OF INVENTION

The present invention generally relates to an information processing apparatus, method, and secure protocol for secure storage and transfer of data. More particularly, secure storage and transfer of data using two-level encryption and two-level decryption by combining RSA and AES keys.

BACKGROUND OF THE INVENTION

Encryption is the process of encoding/masking data (usually sensitive) so that the original information can only be recovered by authorized users.

AES (Advanced Encryption Standard) is the top choice for governments, financial institutions and many securities conscious organizations. The major problem with AES is that it is a symmetric algorithm which means that both encryption and decryption are performed using the same key which means that this is a security management nightmare.

RSA (Rivest, Shamir and Adleman) is an asymmetric algorithm that solves the problem of using the same key by using a public key for encryption and private key for decryption. But the major problem with RSA is that the maximum data size that can be encrypted using RSA is the size of the key minus any bits used for padding (e.g. if the key size used is 2048 bits then the max data size that can be encrypted=2048−(padding+header) bits). Additionally, RSA is computationally more intensive than AES which makes it much slower than RSA.

So, there is a need for an information processing apparatus for securely store and transfer the data by combining AES key and an RSA key pair.

OBJECT OF THE INVENTION

The principal object of the invention is to secure storage and transfer of data using two-level encryption and two-level decryption by combining AES key and RSA key pair.

Another object of the invention is to create a highly secure cyber security protocol by combining RSA and AES keys to encrypt user data.

Another object of the invention is to generate company-wide AES+RSA key set.

Another object of the invention is to generate an AES and an RSA key pair for each user.

Another object of the invention is to encrypt AES user key and company AES key using user's RSA public key and company's RSA public key respectively before storing it in the database for providing high level data security.

Another object of the invention is to access the encrypted AES user key and encrypted company AES key using user's RSA private key and company's RSA priviate key respectively.

Another object of the invention is to encrypt the data to level 1 using decrypted AES user key and encrypt the data from level 1 to level 2 using decrypted company AES key.

Another object of the invention is to store the encrypted user AES key and encrypted company AES key in a user's column/row level secure database and company's column/row level secure database respectively.

These and other objects and characteristics of the present invention will become apparent from the further disclosure to be made in the detailed description given below.

SUMMARY OF THE INVENTION

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

The invention provides an information processing apparatus, method and security protocol for secure storage and transfer of data by combining AES key and RSA key pair. The apparatus includes a circuitry. The circuitry is configured to receive encryption request associated with the data to be transmitted. Upon receiving the encryption request, the circuitry encrypt the data to level-1, wherein the encryption of the data is based on an AES user key and the received encryption request. The used AES user key is based on an RSA private key associated with the user. The circuitry is further configured to encrypt the level-1 data to generate level-2 data, wherein the encryption of the level 1-data is based on a company AES key. The used company AES key is based on an RSA private key associated with the company. The circuitry is further configured to decrypt the level-2 data to generate level-1 data, wherein the decryption of the level-2 data is based on a company AES key. The used company AES key is based on the RSA private key associated with the company. The circuitry is further configured to decrypt the level-1 data to generate the transmitted data, wherein the decryption of the level-1 data is based on an AES user key. The AES user key is based on the RSA private key associated with the user.

These together with other objects of the invention, along with the various features of novelty which characterize the invention, are pointed out with particularity in the disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF DRAWINGS

The foregoing and other features of embodiments will become more apparent from the following detailed description of embodiments when read in conjunction with the accompanying drawings. In the drawings, like reference numerals refer to like elements.

In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

DETAILED DESCRIPTION OF INVENTION

Figure 1:
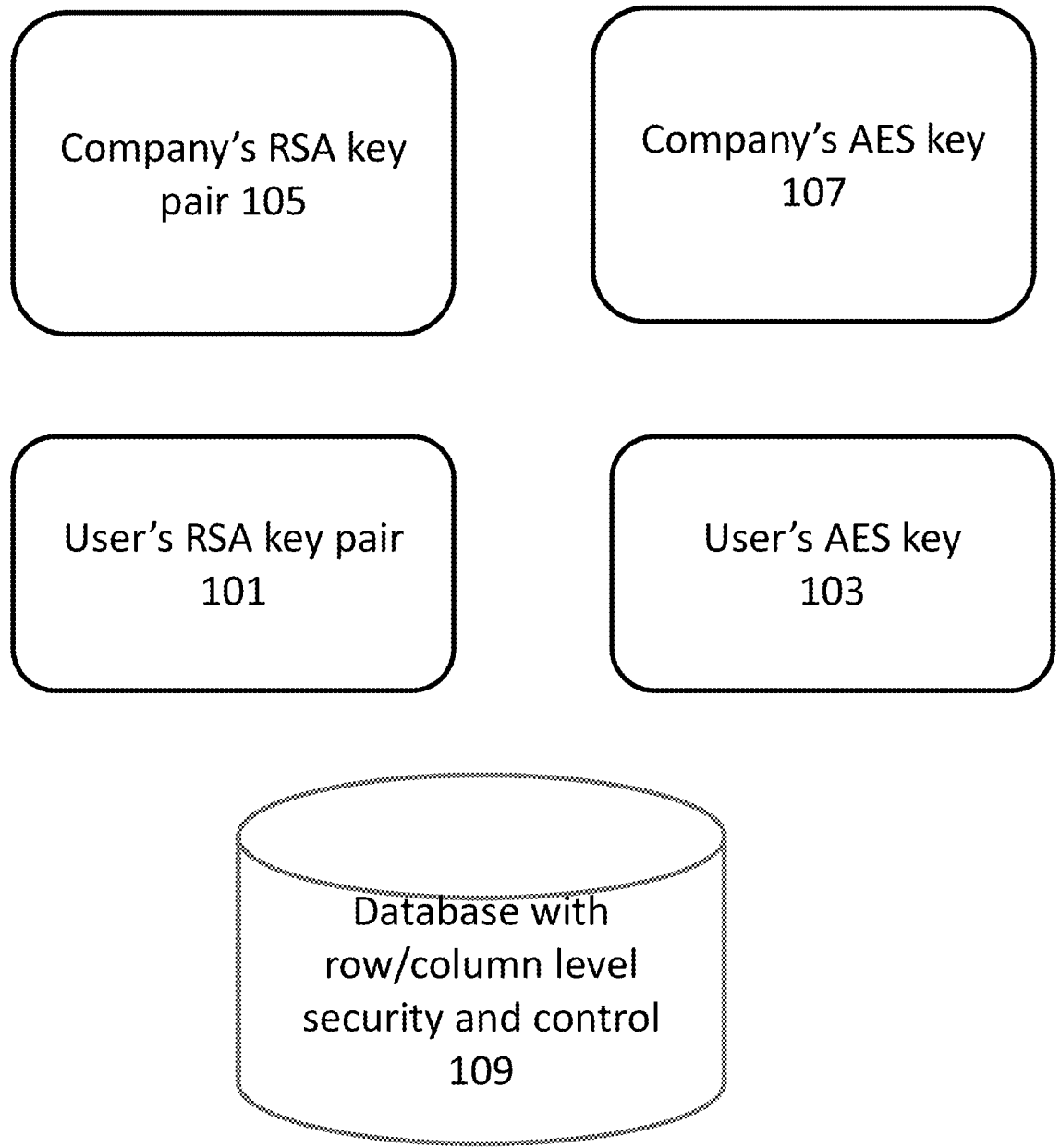
FIG. 1 illustrates components of an information processing apparatus for secure storage and transfer of data, according to one embodiment of the invention.

The embodiments herein and the various features and advantageous details thereof are explained more fully with reference to the non-limiting embodiments that are illustrated in the accompanying drawings and/or detailed in the following description. Descriptions of well-known components and processing techniques are omitted so as to not unnecessarily obscure the embodiments herein. The examples used herein are intended merely to facilitate an understanding of ways in which the embodiments herein may be practised and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon the present disclosure.

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present and d) the interconnected brain and spinal cord circuits (both anatomical and functional circuits).

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

FIG. 1 illustrates components of an information processing apparatus for secure storage and transfer of data, according to one embodiment of the invention. Referring now to the drawings, in the FIG. 1, the components of an information processing apparatus may include company's RSA key pair (105), company's AES key (107), user's RSA key pair (101), user's AES key (103), and database with column/row level security and control (109).

In an example embodiment, to generate company's RSA key pair (105), a cryptographically strong random seed (use this as the company's hash) using Java's security implementation of FIPS.140-2 security requirements for cryptographic modules may be generated. A 2048-bits company's RSA keypair (105) may be generated using a KeyPairGenerator. The generated company's RSA key pair (105) includes company's RSA public key (105b), company's RSA private key (105a) and that may be stored in a company's column/row level secure database (109b).

In an example embodiment, to generate company's AES key (107), the company's public key (105b) from the company's column/row level secure database (109b) using the company's identifier may be retrieved. A cryptographically strong random seed (use this as the company's hash) using Java's security implementation of FIPS.140-2 security requirements for cryptographic modules may be generated. A 128-bit company's AES key (107) may be generated using a KeyPairGenerator. The generated company's AES key (107) may be encrypted using the previously retrieved company's public key (105*b*). The encrypted company's AES key (107) may be stored in the company's column/row level secure database (109*b*).

In an example embodiment, to generate user's RSA key pair (101), a cryptographically strong random seed (use the user Id of the user logging in) using Java's security implementation of FIPS.140-2 security requirements for cryptographic modules may be generated. A 2048-bits user's RSA keypair (101) is generated using a KeyPairGenerator. The generated user's RSA key pair (101) includes user's public key (101*b*), user's private key (101*a*) and that may be stored in the user's column/row level secure database (109*a*).

In an example embodiment, to generate user's AES key (103), the user's public key (101*b*) may be retrieved from the user's column/row level secure database (109*a*) using the user Id identifier. A cryptographically strong random seed (use the user Id of the user logging in) using Java's security implementation of FIPS.140-2 security requirements for cryptographic modules may be generated. A 128-bit user's AES key (103) may be generated using a KeyPair Generator. The generated user's AES key (103) may be encrypted using the user's public Key (101*b*) retrieved earlier. The encrypted user's AES key (103) may be stored in the user's column/row level secure database (109*a*).

Figure 2:
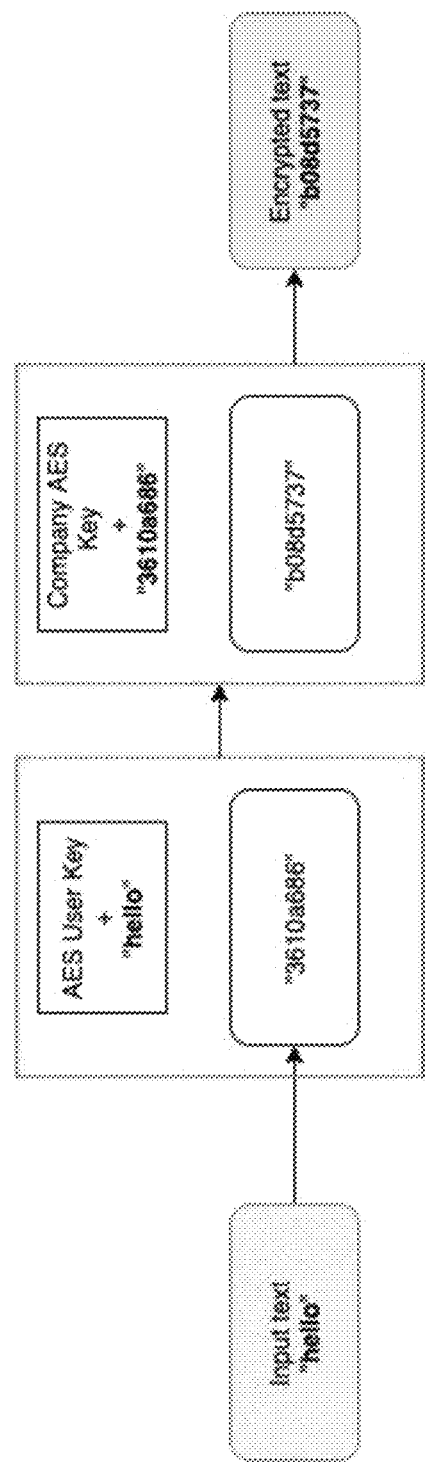
FIG. 2 illustrates working of encryption of data in an information processing apparatus for secure storage and transfer of data, according to one embodiment of the invention.

FIG. 2 illustrates working of encryption of data in an information processing apparatus for secure storage and transfer of data, according to one embodiment of the invention. Referring to FIG. 2, in order to encrypt the input data for secure communication, a circuitry (100) may be configured to receive encryption request associated with the data to be transmitted. The circuitry (100) may be further configured to encrypt the data to generate first encryption data that is the input data to level-1, wherein the encryption of the data is based on an AES user key (103) associated with a user and the received encryption request, and the AES user key (103) is based on an RSA private key (101*a*) associated with the user. The circuitry (100) may be further configured to encrypt the first encryption data to generate second encryption data that is encrypt the data from level-1 to level-2, wherein the encryption of the first encryption data is based on a company AES key (107), and the company AES key (107) is based on an RSA private key (105*a*) associated with the company.

Figure 3:
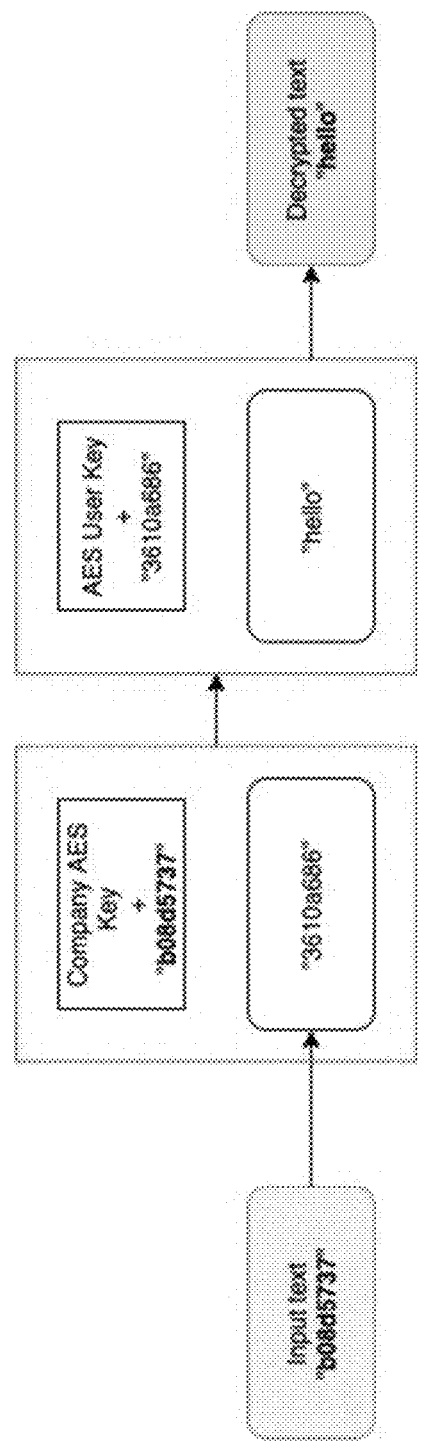
FIG. 3 illustrates working of decryption of data in an information processing apparatus for secure storage and transfer of data, according to one embodiment of the invention.

FIG. 3 illustrates working of decryption of data in an information processing apparatus for secure storage and transfer of data, according to one embodiment of the invention. Referring to FIG. 3, in order to decrypt the data, a circuitry (100) may be configured to decrypt the second encryption data to generate first decryption data that is decryption of data from level-2 to level-1, wherein the decryption of the second encryption data is based on a company AES key (107), and the company AES key (107) is based on the RSA private key (105*a*) associated with the company. The circuitry (100) may be further configured to decrypt the first decryption data to generate the second decryption data that is decryption data from level-1 to original input data, wherein the decryption of the first decryption data is based on an AES user key (103), the AES user key (103) is based on the RSA private key (101*a*) associated with the user, and the second decryption data corresponds to the transmitted data that is originally transmitted data.

Figure 4:
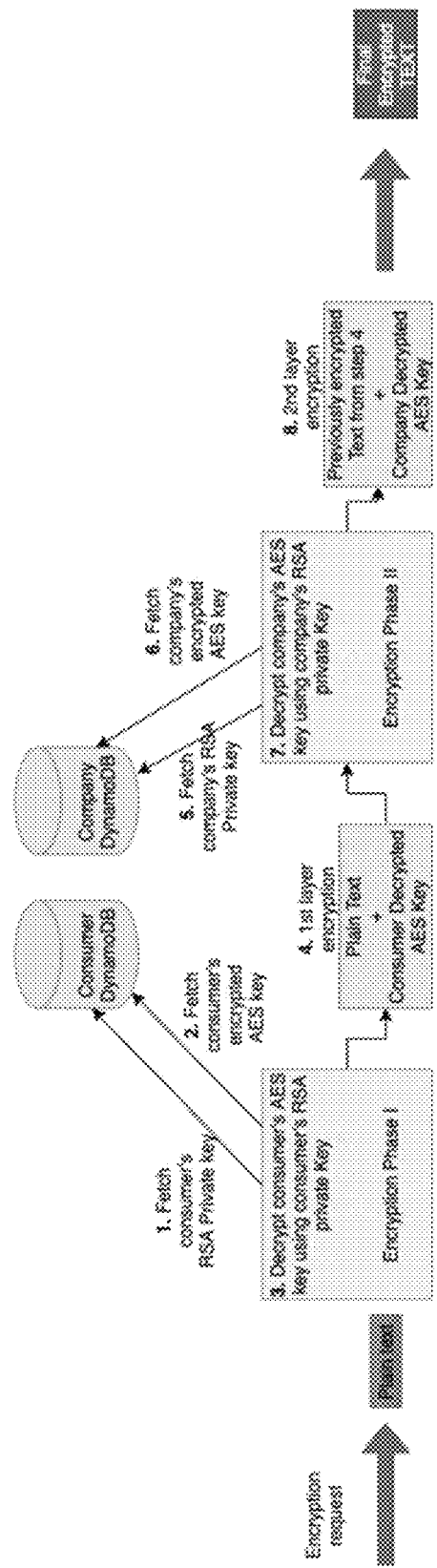
FIG. 4 illustrates encryption flow of data in an information processing apparatus for secure storage and transfer of data, according to one embodiment of the invention.

FIG. 4 illustrates encryption flow of data in an information processing apparatus for secure storage and transfer of data, according to one embodiment of the invention. Referring to FIG. 4, to encrypt the input data, step-1 includes retrieving the private key of the RSA key pair of the user (101*a*) that is stored in the user's database (109*a*).

In an example embodiment, step-2 includes retrieving the encrypted AES key of the user (103) from the user's database (109*a*)

In an example embodiment, step-3 includes decrypting the user's AES key (103) using the user's private key (101*a*) from Step 1.

In an example embodiment, step-4 includes encrypting the input data to level-1 or first encryption data using the decrypted user AES key (103).

In an example embodiment, step-5 includes retrieving the private key of the RSA key pair of the company (105*a*) that is stored in the company's database (109*b*).

In an example embodiment, step-6 includes retrieving the encrypted AES key of the Company (107) from the company's database (109*b*).

In an example embodiment, step-7 includes decrypting the company's AES key (107) using the company's private key (105*a*) from the RSA key pair.

In an example embodiment, step-8 includes encrypting the data from level-1 to level-2 that is from first encryption data to second encryption data using the company's decrypted AES key (107).

In an example embodiment, step-9 includes storing the encrypted data in a database.

Figure 5:
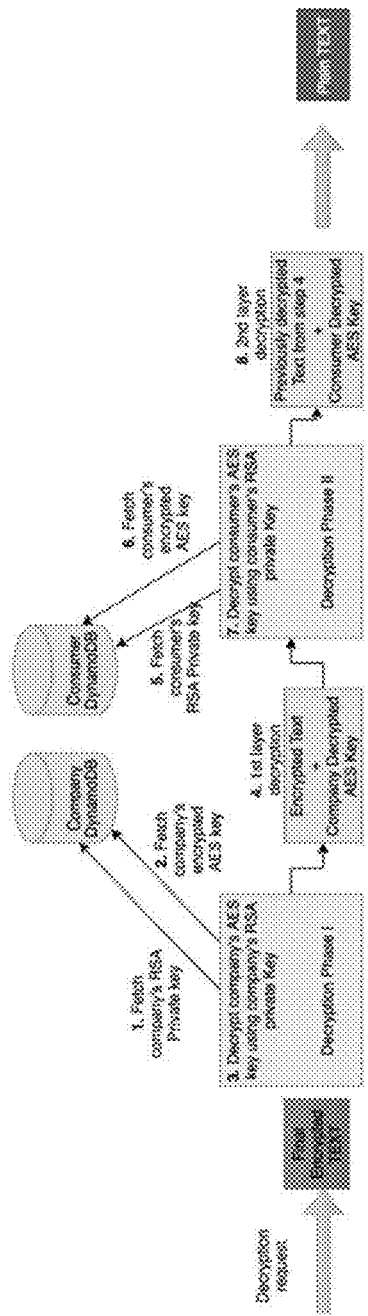
FIG. 5 illustrates decryption flow of data in an information processing apparatus for secure storage and transfer of data, according to one embodiment of the invention.

FIG. 5 illustrates decryption flow of data in an information processing apparatus for secure storage and transfer of data, according to one embodiment of the invention. Referring to FIG. 5, to decrypt the data, step-1 includes retrieving the private key of the RSA key pair of the Company (105*a*) that's stored in the company's database (109*b*).

In an example embodiment, step-2 includes retrieving the encrypted AES key of the Company (107) from the company's database (109*b*).

In an example embodiment, step-3 includes decrypting the company's AES key (107) using the company's private key (105*a*) from the RSA key pair.

In an example embodiment, step-4 includes decrypting the data to level-1 that is second encryption data to first decryption data using the decrypted company AES key (107).

In an example embodiment, step-5 includes retrieving the private key of the RSA key pair of the user (101*a*) that's stored in the user's database (109*a*).

In an example embodiment, step-6 includes retrieving the encrypted AES key of the user (103) from the user's database (109*a*).

In an example embodiment, step-7 includes decrypting the user's AES Key (103) using the user's private key (101*a*).

In an example embodiment, step-8 includes decrypting the data from level-1 to level-2 that is from first decryption data to second decryption data using user's AES key (103). Now this will give the original plain text decrypted data.

Figure 6A:
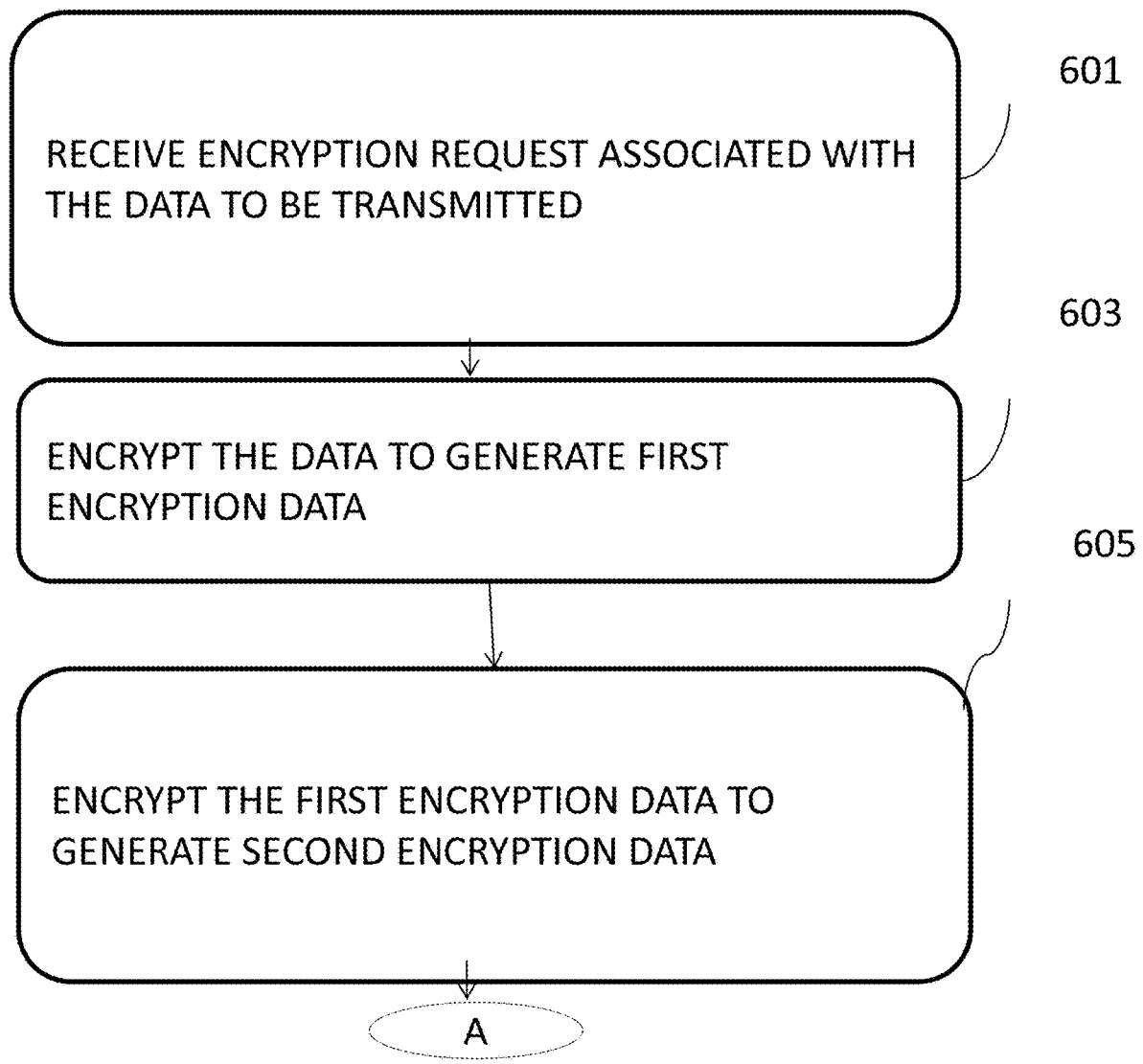
FIG. 6A to 6B illustrates a method for secure storage and transfer of data, according to one embodiment of the invention.
Figure 6B:
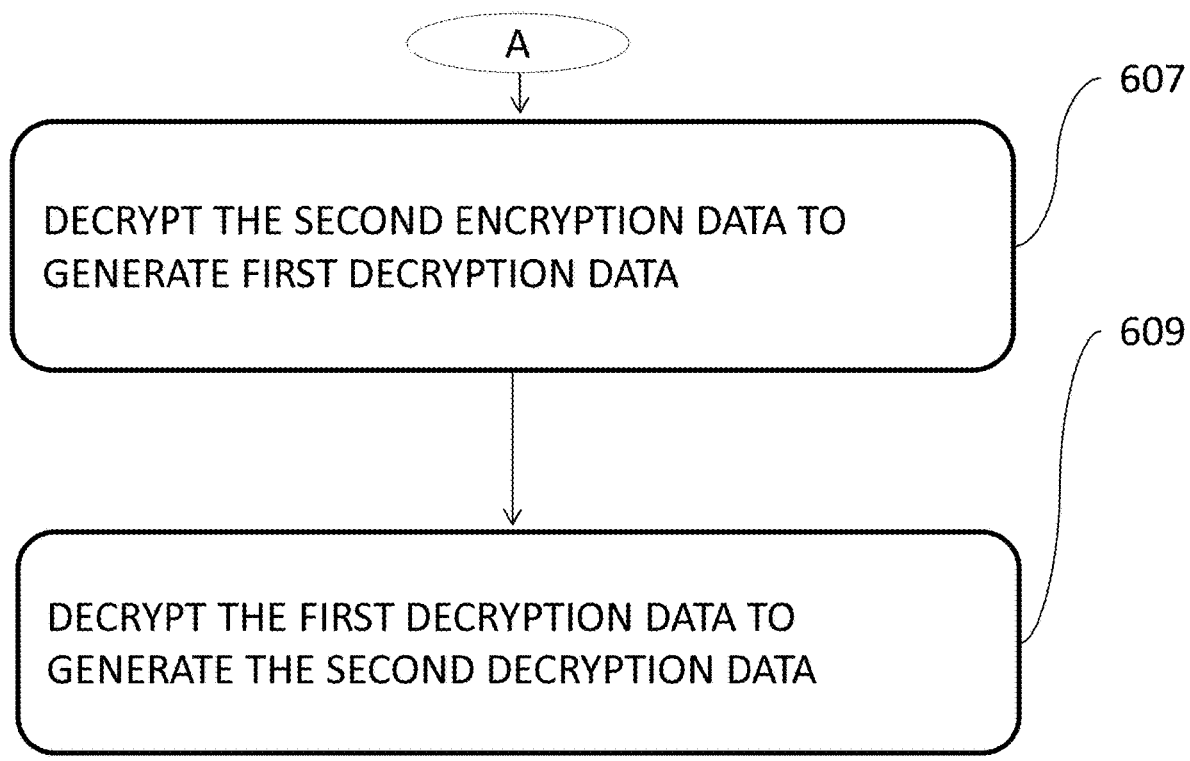

FIG. 6A to 6B illustrates a method for secure storage and transfer of data, according to one embodiment of the invention. In an example embodiment, at step 601, the circuitry (100) may be configured to receive encryption request associated with the data to be transmitted.

In an example embodiment, at step 603, the circuitry (100) may be configured to encrypt the data to generate first encryption data, wherein the encryption of the data is based on an AES user key (103) associated with a user and the received encryption request, and the AES user key (103) is based on an RSA private key (101a) associated with the user.

In an example embodiment, at step 605, the circuitry (100) may be configured to encrypt the first encryption data to generate second encryption data, wherein the encryption of the first encryption data is based on a company AES key (107), and the company AES key (107) is based on an RSA private key (105a) associated with the company.

In an example embodiment, at step 607, the circuitry (100) may be configured to decrypt the second encryption data to generate first decryption data, wherein the decryption of the second encryption data is based on a company AES key (107), and the company AES key (107) is based on the RSA private key (105a) associated with the company.

In an example embodiment, at step 609, the circuitry (100) may be configured to decrypt the first decryption data to generate the second decryption data, wherein the decryption of the first decryption data is based on an AES user key (103), the AES user key (103) is based on the RSA private key (101a) associated with the user, and the second decryption data corresponds to the transmitted data.

Thus, the information processing apparatus and security protocol for secure storage and transfer of data creates a highly secure cyber security protocol by combining RSA and AES keys to encrypt user data.

The data encryption happens using the user's AES key and user's AES key will be encrypted before storing which adds a very high level of security to existing solutions, that is the reason the user's AES key is encrypted using the user's RSA public key and then encrypted AES key is stored.

This two-level encryption provides the highest level of encryption and also solves the security management nightmare that arises using only AES keys.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. An information processing apparatus for secure storage and transmission of data, comprising:
   circuitry (100) configured to:
      receive encryption request associated with the data to be transmitted;
      encrypt the data to generate first encryption data, wherein
         the encryption of the data is based on an Advanced Encryption Standard (AES) user key (103) associated with a user and the received encryption request, and
         the AES user key (103) is based on an Rivest, Shamir and Adleman (RSA) private key (101a) associated with the user;
      encrypt the first encryption data to generate second encryption data, wherein
         the encryption of the first encryption data is based on a company AES key (107), and
         the company AES key (107) is based on an RSA private key (105a) associated with the company;
      decrypt the second encryption data to generate first decryption data, wherein
         the decryption of the second encryption data is based on the company AES key (107), and
         the company AES key (107) is based on the RSA private key (105a) associated with the company;
      decrypt the first decryption data to generate the second decryption data, wherein
         the decryption of the first decryption data is based on the AES user key (103),
         the AES user key (103) is based on the RSA private key (101a) associated with the user; and
         the second decryption data corresponds to the transmitted data; and
      wherein the AES user key (103) is encrypted using an RSA public key (101b) associated with the user; and
      wherein the encrypted AES user key (103) is stored in a user's column/row level secure database (109a); and
      wherein the company AES key (107) is encrypted using an RSA public key (105b) associated with the company; and
      wherein the encrypted company AES key (107) is stored in a company's column/row level secure database (109b).

2. The information processing apparatus as claimed in claim 1, wherein a keypair generator generates a 2048-bits company RSA keypair (105).

3. The information processing apparatus as claimed in claim 1, wherein the keypair generator generates a 128-bits company AES key (107).

4. The information processing apparatus as claimed in claim 1, wherein the keypair generator generates a 2048-bits user RSA keypair (101).

5. The information processing apparatus as claimed in claim 1, wherein the keypair generator generates a 128-bits AES user key (103).

6. An information processing method for secure storage and transmission of data, the method comprising:
   receiving encryption request associated with the data to be transmitted;
   encrypting the data to generate first encryption data, wherein
      the encryption of the data is based on an Advanced Encryption Standard (AES) user key (103) associated with a user and the received encryption request, and
      the AES user key (103) is based on an Rivest, Shamir and Adleman (RSA) private key (101a) associated with the user;
   encrypting the first encryption data to generate second encryption data, wherein
      the encryption of the first encryption data is based on a company AES key (107), and
      the company AES key (107) is based on an RSA private key (105a) associated with the company;
   decrypting the second encryption data to generate first decryption data, wherein
      the decryption of the second encryption data is based on the company AES key (107), and the company AES key (107) is based on the RSA private key (105*a*) associated with the company;

decrypting the first decryption data to generate the second decryption data, wherein the decryption of the first decryption data is based on the AES user key (103), the AES user key (103) is based on the RSA private key (101*a*) associated with the user; and the second decryption data corresponds to the transmitted data; and wherein the AES user key (103) is encrypted using an RSA public key (101*b*) associated with the user; and wherein the encrypted AES user key (103) is stored in a user's column/row level secure database (109*a*); and wherein the company AES key (107) is encrypted using an RSA public key (105*b*) associated with the company; and wherein the encrypted company AES key (107) is stored in a company's column/row level secure database (109*b*).

\* \* \* \* \*